United States Patent
Mehnert et al.

(10) Patent No.: US 11,647,854 B1
(45) Date of Patent: May 16, 2023

(54) SMART CONTAINER FOR DETERMINING FLUID CONTENTS

(71) Applicant: Amazon Technologies, Inc., Seattle, WA (US)

(72) Inventors: Herbert Franz Mehnert, Seattle, WA (US); Megan Heffernan, Seattle, WA (US); Naveenan Vasudevan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 488 days.

(21) Appl. No.: 16/782,000

(22) Filed: Feb. 4, 2020

(51) Int. Cl.
| | |
|---|---|
| *A47G 19/22* | (2006.01) |
| *G01N 21/33* | (2006.01) |
| *G01N 21/27* | (2006.01) |
| *H04L 67/12* | (2022.01) |
| *H04W 4/80* | (2018.01) |
| *G01F 22/00* | (2006.01) |

(52) U.S. Cl.
CPC ......... *A47G 19/2227* (2013.01); *G01F 22/00* (2013.01); *G01N 21/27* (2013.01); *G01N 21/33* (2013.01); *H04L 67/12* (2013.01); *H04W 4/80* (2018.02)

(58) Field of Classification Search
CPC ........ G01F 22/00; G01N 21/27; G01N 21/33; H04L 67/12; H04W 4/80; A47G 19/2227
USPC ......................................................... 220/703
See application file for complete search history.

(56) References Cited

U.S. PATENT DOCUMENTS

| | | | | |
|---|---|---|---|---|
| 2016/0123876 | A1* | 5/2016 | Muldoon | G01N 21/65 356/338 |
| 2019/0242816 | A1* | 8/2019 | Conner | G01N 33/04 |
| 2020/0196782 | A1* | 6/2020 | Lee | A47G 19/2227 |

FOREIGN PATENT DOCUMENTS

WO  WO-2015175969 A1 * 11/2015 ............. A47G 19/22

* cited by examiner

*Primary Examiner* — Hirdepal Singh
(74) *Attorney, Agent, or Firm* — Eversheds Sutherland (US) LLP

(57) ABSTRACT

Systems, methods, and computer-readable media are disclosed for systems and methods for a smart container designed to determine sensor data corresponding to fluid contained by the smart container. The smart container may container or more sensors such as a contents sensor for determining the contents of fluid being contained by the smart container. The contents sensor may determine the presence of caffeine and the smart container determine amount of volume consumed by a user. Example methods may include sending the sensor data to a server to be analyzed and displaying data corresponding to the analysis by the server.

20 Claims, 7 Drawing Sheets

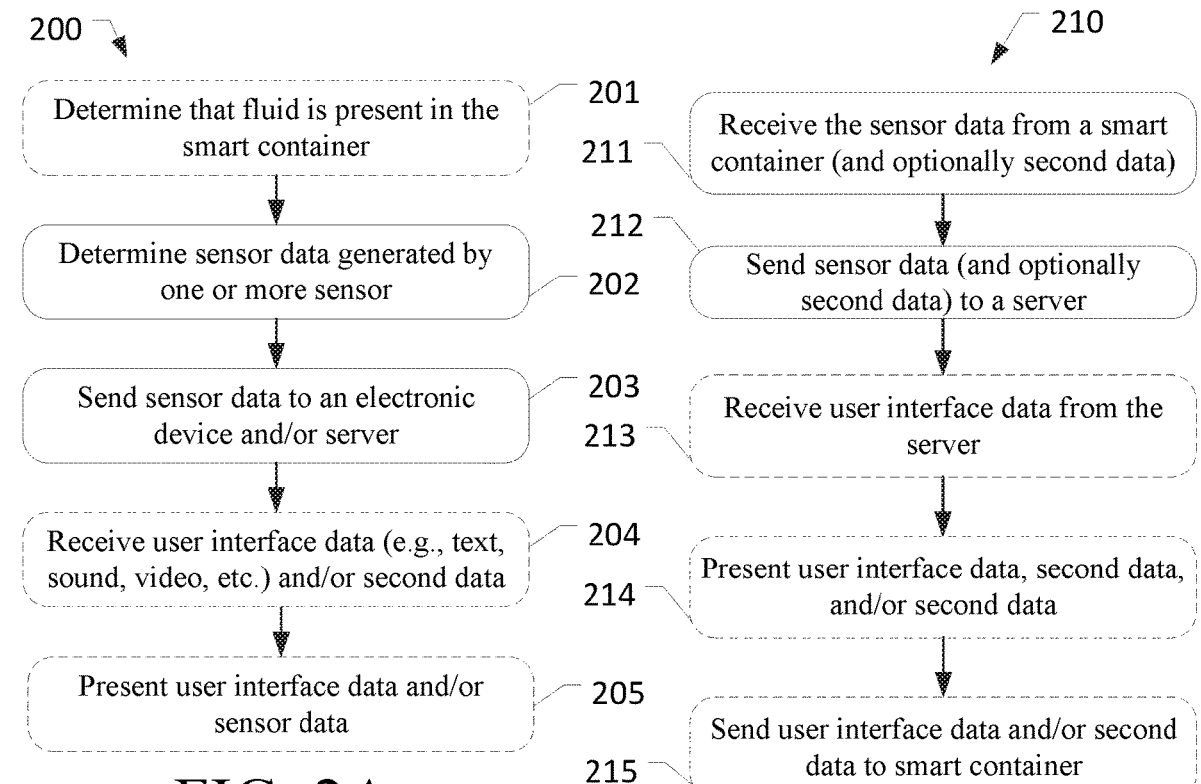
FIG. 2A
FIG. 2B
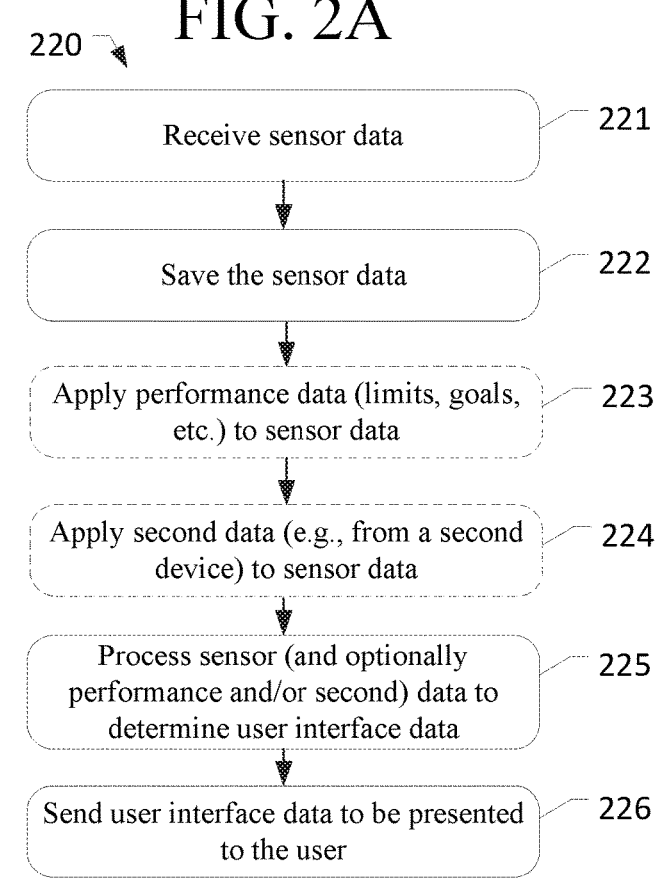
FIG. 2C

US 11,647,854 B1

SMART CONTAINER FOR DETERMINING FLUID CONTENTS

BACKGROUND

Smart devices, such as smartwatches, smart-sensors, and other wearables, may generate information regarding the device as well as the user of the device. In some instances, information from the smart devices may be collected and processed at a central location and combined to generate additional information and insight. For example information regarding the wellbeing of the user may be determined and used by a user to improve the overall health of the user. Liquid consumption can have a significant effect on the general health and wellbeing of an individual. However, it is often difficult to determine the contents and make up of a liquid being consumed using smart devices and wearables and thus this information is not easily accessible.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 2A-C are a schematic illustration of exemplary process flows for determining sensor data and sending information corresponding to sensor data between a smart container, one or more electronic device, and one or more servers in accordance with one or more example embodiments of the disclosure.

DETAILED DESCRIPTION

Overview

Figure 1:
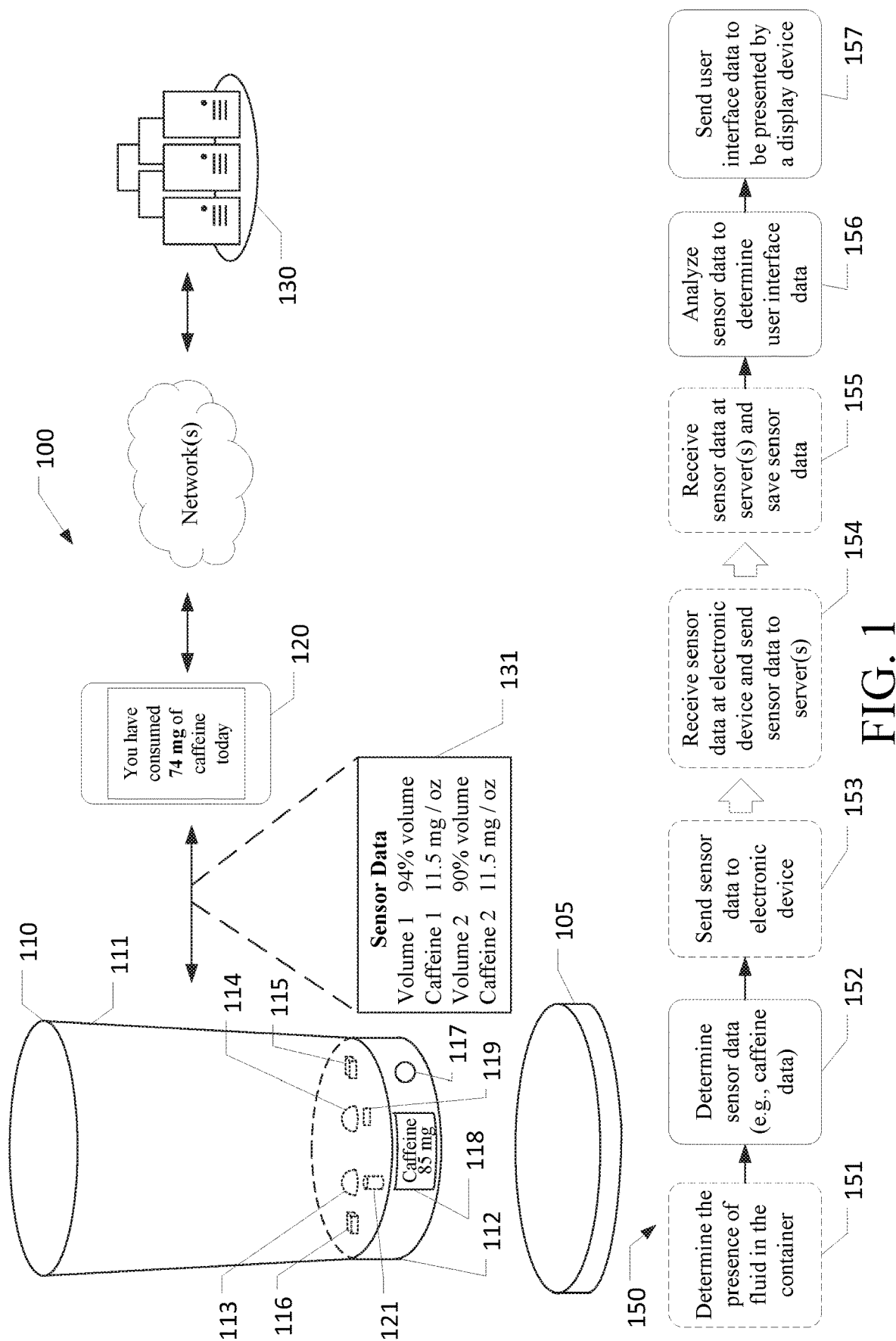
FIG. 1 is a schematic illustration of an example use case for determining sensor data by a smart container and sending information corresponding to the sensor data to one or more servers via one or more electronic devices in accordance with one or more example embodiments of the disclosure.

Smart containers may be devices designed to retain a fluid or solid having processing power, one or more sensors designed to determine information about the device or a user of the device, and may be in wired or wireless communication with one or more electronic devices. The smart container may display or otherwise provide information to a user (e.g., via a speaker) and/or may send information to one or more electronic devices, such as a mobile device, tablet, laptop, or one or more servers. Smart containers may even receive information from the one or more electronic devices and display or otherwise provide received information to a user.

Smart containers may be drinkware in the shape of a cup, mug, thermos, bottle, bowl or any other receptacle designed to retain a fluid and/or solid. Smart container may include a container housing portion defining a reservoir for retaining a fluid and an electronics portion that may be removably coupled to the container housing (e.g., via a threaded interchange). Alternatively, the electronic portion may be integrated into the container housing. The smart container may include one or more sensors such as a volume sensor for measuring volume, a temperature sensor for measuring temperature, a contents sensor for determining contents of a fluid in the smart container, and any other type of sensor. The smart container may also include a power source, memory and/or a processor. In some examples, the smart container may include a display and/or speakers. Additionally, the smart container may also include one or more buttons that may be engaged by a user to perform an operation, input a command, or otherwise provide user input data to the smart container.

The contents sensor may be designed to determine the type of contents or make up of a fluid in the smart container. For example, the contents sensor may determine whether caffeine, sugar, salt, and/or alcohol are present in the fluid. Additionally, the contents sensor may determine the amount of contents (e.g., caffeine, sugar, salt, and/or alcohol) present in the fluid. In other examples, the smart sensor may determine contaminants and/or harmful substances present in the fluid. For example, the contents sensor may determine the presence lead, carcinogenic, and/or drug present in the fluid. Contents sensor may be an optical or light sensor or any other sensor designed to convert light to an electrical signal.

The smart container may include a light source, emitting lens, receiving lens, and contents sensor to generate fluid content data using the contents sensor. The emitting lens and the receiving lens may be a dome structure and may be separated by a distance (e.g., 10 mm). It is understood that one or more of the emitting lens and receiving lens may be positioned on the electronics portion or the container housing portion. It is further understood that the emitting lens and receiving lens may be a protrusion, an indentation or any other structure from which light may be sent from emitting lens and received at the receiving lens. The light source may be any type of light source such as an ultraviolet (UV) light source and thus may generate UV light. The emitting lens may include a mirror that is in optical communication with the light source and may guide light through a lens and to the receiving lens. The receiving lens may include a mirror to guide received light to the contents sensor. UV light may travel through the fluid or solid between the emitting lens and the receiving lens. An original light intensity may be compared to a light intensity determined by the contents sensor to determine a percentage of light absorbed, reflected, or otherwise reduced by the fluid. Certain contents may be known to reduce the light by a certain percentage or amount. For example, a library of contents (e.g., concentrations of caffeine, sugar, salt, etc.) and known percentages or reduced amounts may be consulted to determine fluid contents based on the light percentage.

Alternatively, the receiving lens may include a grating to diffract light received from the emitting lens as well as a mirror that is in optical communication with the light source to guide diffracted light received through the grating to the contents sensor. The contents sensor may be designed to receive the diffracted light and determine a wavelength absorption data including wavelength absorption values. For example, the contents sensor may determine an absorption value for various wavelengths of light. The absorption value may be indicative of an amount of light absorbed by the fluid or solid between the emitting lens and the receiving lens. A wavelength absorption plot may be determined using the data determined by the contents sensor. The wavelength absorption plot may be compared to a library of wavelength absorption plots having a plurality of wavelength absorption plots and associated known fluid contents to determine the fluid or solid contents in the smart container Data and information determined and/or generated by the smart container may be sent to a server for analysis. For example, the data and/or information may be sent from the smart container to an electronic device over a short range communication protocol (e.g., Bluetooth or Bluetooth Low Energy (BLE)). The electronic device may then send the data and/or information to one or more server (e.g., over the internet). One or more servers may collect data and/or information from different smart devices and may analyze and process the data and/or information. The data and/or information may be used to generate further analysis and insight. The one or more servers may then cause data and or insight corresponding to the information and/or data received from the smart devices to be displayed or stored on one or more display devices which may be a smart device or other electronic device.

Referring to FIG. 1, an example use case 100 for determining sensor data using a smart container 110 and sending information corresponding to the sensor data to an electronic device 120 and/or one or more servers 130 is depicted in accordance with one or more example embodiments of the disclosure. In the illustrated example, the smart container 110 may communicate with an electronic device 120 and the electronic device 120 may communicate with server(s) 130 which may be one or more servers. Smart container 110 may alternatively, or additionally, be in direct communication with server 130. Smart container 110 may communicate with electronics device 120 and/or server(s) 130 via any well-know wired or wireless system (e.g., Bluetooth, Bluetooth Low Energy (BLE), near field communication protocol, Wi-Fi®, cellular network, etc.). The electronic device 120 may communicate with the server 130 via any well-known wired or wireless system (e.g., Bluetooth, Bluetooth Low Energy (BLE), near field communication protocol, Wi-Fi®, cellular network, etc.).

The smart container 110 may be an electronic device in the shape of a cup, mug, thermos, bottle, bowl or any other receptacle designed to retain a fluid and/or solid. Smart container 110 may include a container housing portion 111 for retaining a fluid or solid as well as an electronics portion 112 designed to house electronics and/or circuitry (e.g., sensors, displays, speakers, and/or microphones). The electronics portion 112 may also house a power source such as a battery. In one example, the electronics portion 112 may be removably coupled to the container housing portion 111. For example, electronics portion 112 and container housing portion 111 may include a threaded interchange for removably coupling to one another. In this example, electronics portion 112 may serve as a contained wall that may seal with housing portion 111 to retain fluid and/or solids in smart container 110. Alternatively, any other well-known techniques for removably coupling electronics portion 112 to container housing portion 111 may be used.

Electronics portion 112 may be water proof or water resistant to protect the electronic components housed within the electronics portion 112. Container housing portion 111 and optionally electronics portion 112 may be dishwasher safe. It is understood that container housing portion 111 may additionally, or alternatively house electronic components including circuitry, sensors, displays, speakers, and/or microphones. In another example, electronics portion 112 may be integrated into container housing portion 111.

Smart container 110 may include, emitting lens 113, receiving lens 114, sensor 115, sensor 116, button 117, display 118, contents sensor 119, and/or light source 121 as well as various other components described below with respect to FIG. 6 such as memory, a processor and/or a power source as well as circuitry connecting the processor and power source to components of the smart container 110 (e.g., sensor 115, sensor 116, button 17, display 118, contents sensor 119, and/or light source 121). While emitting lens 113, receiving lens 114, sensor 115, sensor 116, button 117, display 118, contents sensor 119, and/or light source 121 are illustrated in FIG. as being disposed on or otherwise incorporated into electronics portion 112, it is understood that one or more components may be disposed on or otherwise incorporated into container housing portion 111. It is further understood that emitting lens 113, receiving lens 114, sensor 115 and/or sensor 116 may be any shape and/or may be a protrusion, an indentation, or may be flush with a wall of smart container 110. Smart container 110 may further include a speaker and/or microphone.

Emitting lens 113 and receiving lens 114 may be protrusions that extend from electronic portion 112. Alternatively, emitting lens 113 and receiving lens 114 may be protrusions that extend from container housing portion 111. As explained in greater detail with respect to FIGS. 3 and 4, emitting lens 113 may include a mirror and/or a lens and receiving lens 114 may include a grating and/or a mirror. Emitting lens 113 and receiving lens 114 may be configured to direct light from light source 121 from emitting lens 113, through a fluid or solid between emitting lens 113 and receiving lens 114 to receiving lens 114 and ultimately to contents sensor 119. In another embodiment, smart container 110 may include an indentation with emitting lens 113 at one end and receiving lens 114 at the other end. Fluid or solids may enter the indentation and light passing from the emitting lens 113 to the receiving lens 114 may pass through the fluid or solid in the indentation.

Sensors 116 and 115 may be any type of sensor such as a temperature sensor, volume sensor, pH sensor, pressure sensor, acoustic sensor, motion sensor (e.g., accelerometer), optical sensor, light sensor, or any other sensor for determining a property of a fluid or solid in the smart container 110 and/or a property, orientation and/or status of the smart device. It is understood that sensors 116 and 115 may be the same or different. Button 117 may be any type of button that can be engaged by a user of smart container 110. For example, button 110 may power smart container 110 on/off. Alternatively, in addition, button 110 may prompt smart container 110 to take a measurement or otherwise perform an operation (e.g., using sensor 115, sensor 116 and/or contents sensor 119). Light source 121 may be any time of light source designed to generate either visible or non-visible light (e.g., ultraviolet (UV) light). Contents sensor may be a sensor designed to determine an intensity of light received and/or determine an absorption value or light intensity value of certain wavelengths of light. In one example, light source 121, emitting lens 113, receiving lens 114, and contents sensor 119 may be a photospectrometer.

Display 118 may optionally be included on electronics portion 112 or container housing portion 111 and may display information corresponding to and/or indicative of information and/or data generated by contents sensor 119, sensor 115, sensor 116 and/or any other sensor of smart container 110. Display 118 may additionally and/or alternatively display information and/or data (e.g., user interface data) received from or otherwise determined or generated by server 130 and/or electronic device 120. Where smart container 110 includes a microphone, such data and/or information may be audibly presented to a user.

Base 105 may charge a power source of smart container 110 using wireless (e.g., inductive charging) or a wired connection. In one example, base 105 may include send and/or receive data from smart container 110, electronic device 120, and/or server 130. The base may communicate with smart container 110, electronic device 120, and/or server 130 via any well-know wired or wireless system (e.g., Bluetooth, Bluetooth Low Energy (BLE), near field communication protocol, Wi-Fi®, cellular network, etc.). In another example, electronics portion 112 may charge a power source using USB charging.

To initiate the actions of determining sensor data at the smart container 110 and sending sensor data and/or information corresponding to the server 130 via the electronic device 120, an example process flow 150 is presented and may be performed, for example, by one or more modules at smart device 110, electronic device 120, and/or server 130. The smart device 110, electronic device 120, and/or server 130 may include at least one memory that stores computer-executable instructions and at least one processor configured to access the at least one memory and execute the computer-executable instructions to perform various actions or operations, such as one or more of the operations in the process flow 150 of FIG. 1. It is understood that one or more operations of process flow 150 may alternatively be performed by one or more of smart device 110, electronic device 120, and/or server 130.

At optional block 151, smart container 110 may determine the presence of fluid in the container. For example, sensor 115 may be a pressure sensor, optical sensor, light sensor, or volume sensor designed to determine the presence of a fluid in smart container 110. Smart container may periodically cause sensor 115 to determine or generate a measurement to determine the presence of fluid. Alternatively, a user of the smart container 110 may engage button 117 to cause smart container 110 to determine the presence of a fluid. In yet another example, sensor 115 may be a passive sensor and may generate a signal when fluid comes into contact with sensor 115.

At block 152, smart container 110 determine sensor data. For example, smart container 110 may cause sensor 119 to determine sensor data corresponding to or indicative of contents of fluid in smart container 110. Sensor data may correspond to the presence of caffeine, sugar, salt, alcohol, or any other component, element, solute, particle, contaminant, and/or pollutant present in the fluid. Determining sensor data may involve generating a light using light source 121, directing light from light source to emitting lens, from emitting lens through the fluid and to the receiving lens, and from the receiving lens to content sensor 119. Sensor data may correspond to or be indicative of a wavelength absorption value or intensity at various wavelengths, as explained below with respect to FIG. 3, or alternatively, or in addition to, a light intensity value, as described in greater detail below with respect to FIG. 4. It is understood that content sensor 119 together with emitting lens 113, receiving lens 114 and/or light source 121 may be a photospectrometer and/or a UV detector. Alternatively, or additionally, smart container 110 may cause sensor 115 and/or sensor 116 to determine sensor data. Sensor data may correspond to or be indicative of a temperature of a fluid in the smart container 110, volume of fluid in smart container 110, pH balance of fluid in smart container 110, orientation or movement information of smart container 110, or any other information that may be generated by sensor 115 and/or sensor 116 and may correspond to or be indicative of the in fluid in smart container 110 or any other property of smart container 110 (e.g., temperature, pressure, etc.). It is understood that sensor data and/or information corresponding to sensor data may involve data based light intensity and/or a wavelength absorption or intensity at various wavelengths. For example, as explained in FIGS. 3 and 4, sensor data may include fluid content data corresponding to contents of the fluid in smart container 110.

At optional block 153, smart container 110 may send sensor data to electronic device 120. For example, signal 131 may be one or more signals sent to electronic device 120 from smart container 110. Signal 131 may include sensor data and/or information corresponding to or indicative of sensor data. For example, signal 131 may include a first volume measurement having a value of 94% volume, a first caffeine measurement having a value of 11.5 mg/oz, a second volume measurement having a value of 90% volume, and second caffeine measurement having a value of 11.5 mg/oz. Signal 131 may correspond to a user of smart container 110 that consumed coffee having a caffeine content of 11.5 mg/oz. The drop in volume percentage may indicate how much of the liquid was consumed. As the volume of container housing portion 111 is known, this information can be used to determine the volume of liquid in smart container 110. A explained above, smart container 110 may communicate with electronic device 120 via any well-known wired or wireless system (e.g., Bluetooth, Bluetooth Low Energy (BLE), near field communication protocol, Wi-Fi®, cellular network, etc.). In an alternative embodiment, smart container 110 may communicate directly with server 130 using the same well-known wired or wireless systems.

At optional block 154, the electronic device 120 may receive sensor data and/or information corresponding to sensor data from the smart container 110. Additionally at optional block 154, the electronic device 120 may send the sensor data and/or information corresponding to sensor data to server 130. As explained above, electronic device 120 may communicate with server 130 via any well-known wired or wireless system (e.g., Bluetooth, Bluetooth Low Energy (BLE), near field communication protocol, Wi-Fi®, cellular network, etc.). Electronic device 120 may optionally save the sensor data and/or information corresponding to sensor data and/or may even display or otherwise present sensor data and/or information corresponding to sensor data on electronic device 120. For example, electronic device may display that the caffeine content is 11.5 mg/oz and/or that the remaining volume in the smart container 110 is 90% volume. In one example, the electronic device 120 may be a mobile device of the user that may be in close proximity to smart container 110 such that close range communication systems such as Bluetooth and/or BLE may be used to send information between electronic device 120 and smart container 110.

At optional block 155, the server 130 may receive the sensor data and/or information corresponding to the sensor data determined by the smart container 110. Sensor data and/or information corresponding to the sensor data may be saved on server 130. Alternatively, or in addition, sensor data and/or information corresponding to the sensor data may be saved on a different device such as one or more electronic devices, remote servers, and/or datastores. The signal sent from smart container may also include information about the smart container and/or a user account associated with the smart container (e.g., an account number, a product number, a device number, etc.).

At block 156, the server 130 may analyze the sensor data and/or information corresponding to the sensor data. Server 130 may use sensor data and/or information corresponding to the sensor data to generate additional data, analysis, and/or insight regarding smart container 110, the fluid in smart container 110, and/or information about an individual corresponding to a user account associated with smart container 110. For example, server 130 may generate plots (e.g., wavelength absorption plots), databases, and graphics based on sensor data and other known data or information. As explained below in greater detail with respect to FIGS. 3 and 4, server 130 may compare sensor data to known information such as a library or database of known information. For example, server 130 may consult with a library or database of information involving a plurality of light intensity values associated to a plurality of fluid contents. Alternatively, or in addition, server 130 may consult a library or database of known wavelength absorption plots associated with a plurality of known fluid contents. Based on the sensor data, information corresponding to the sensor data, determined data, analysis, and/or insight, server 130 may determine user interface data (e.g., graphics, text, tables, and/or images) be displayed or otherwise presented (e.g., audibly) by a display device.

At block 157, server 130 may cause the user interface data to be displayed on one or more display devices. For example, server 130 may send the display device the user interface data and/or instruct the display device to display or otherwise present the user interface data. Alternatively, or in addition, server 130 may inform the display device that the user interface data is available to be presented via the display device. The user interface data may be saved on server 130 and/or may be saved on a different device such as one or more electronic devices, remote servers, and/or datastores. A display device may be electronic device 120 and/or smart container 110 or any other user device. For example, electronic device 120 may receive user interface data from server 130 and display on electronic device 120 the text, "You have consumed 74 mg of caffeine today." Smart container may receive user interface data from server 130 and/or electronic device 120. Smart container may display received user interface data. For example, smart container may display the text, "Caffeine 85 mg."

Embodiments of the disclosure may improve computing efficiency and bandwidth by reducing a number of actions and calculations that need to be performed to initiate certain tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

FIGS. 2A-2C depict example process flows for determining sensor data, sending and receiving sensor data, receiving sensor data, determining user interface data, sending and/or receiving user interface data, and/or presenting user interface data. While example embodiments of the disclosure may be described in the context of a smart container, it should be appreciated that the disclosure is more broadly applicable to various types of smart receptacles and/or utensils as well as devices including containers to hold fluids or solids not intended for human consumption. Some or all of the blocks of the process flows in this disclosure may be performed in a distributed manner across any number of devices. The operations of the process flow 200, process flow 210 and process flow 220, described below with respect to FIGS. 2A-2C, respectively, may be optional and may be performed in a different order.

FIG. 2A depicts an example process flow 200 for determining sensor data at a smart container 110, sending sensor data and receiving user interface data at the smart container 110. At optimal block 201, computer-executable instructions stored on a memory of a device, such as a smart container, may be executed to determine whether fluid is present in the smart container. As explained above, sensor 115 may be a pressure sensor, optical sensor, light sensor, or volume sensor, for example, designed to determine the presence of a fluid in smart container 110. The smart container may periodically cause a sensor to determine or generate a measurement to determine the presence of fluid in the smart container 110. Alternatively, a user may engage a button or otherwise instruct the smart container 110 to determine the presence of a fluid. In another example, the sensor may be a passive sensor and may generate a signal when fluid comes into contact with the sensor. The computer executable code executed at block 201 may be senor module 626.

At block 202, computer-executable instructions stored on a memory of a device, such as a smart container, may be executed to determine sensor data. As explained above, the smart container 110 may cause a sensor or a contents sensor to determine sensor data. Sensor data may correspond to the presence of caffeine, sugar, salt, alcohol, or any other ingredient, element, solute, particle, contaminant, and/or pollutant present in the fluid. Sensor data may also, correspond to or be indicative of a wavelength absorption or intensity at various wavelengths, as explained with respect to FIG. 3, or alternatively, or in addition to, a light intensity value, as described in greater detail with respect to FIG. 4. Alternatively, or additionally, sensor data may correspond to or be indicative of a temperature of a fluid in the smart container 110, volume of fluid in smart container 110, pH balance of fluid in smart container 110, orientation or movement information of smart container 110, or any other information that may be generated by a sensor and may correspond to or be indicative of the in fluid in smart container 110 or any other property of smart container 110 (e.g., temperature, pressure, etc.). The computer executable code executed at block 202 may be senor module 626.

At block 203, computer-executable instructions stored on a memory of a device, such as a smart container, may be executed to send sensor data to an electronic device 120. As explained above, the electronic device 120 may be in close proximity to smart container 110 such that close range communication systems such as Bluetooth and/or BLE may be used to send information between electronic device 120 and smart container 110. Alternatively, the sensor data and other data may be sent via other well-known wireless connections such as WiFi, ZigBee, Near Field Communication, cellular or another suitable wireless connection protocol. Alternatively, or in addition, smart container may send sensor data directly to a server. The sensor data sent to electronic device 120 may include data from one or more types of sensor and one or more readings or measurements. For example, smart container 110 may send sensor data indicative of the contents of the fluid, the temperature of the fluid and/or the volume of fluid in smart container 110. Smart container 110 may also send other information to electronic device 120 and/or server 130 such information corresponding to a user account associated with the smart container 110, a device identifier of the smart container, and/or product information (e.g., information about product type or model type). The computer executable code executed at block 203 may be communication module 628.

At optional block 204, computer-executable instructions stored on a memory of a device, such as a smart container, may be executed to receive user interface data and/or second data from a server 130 and/or an electronic device 120. In one example, smart container 110 may be a display device and may receive user interface data determined or generated by sever 130 to be presented to a user via smart container 110 (e.g., on a display or through a speaker). The smart container 110 may receive user interface data directly from the server 130 or user interface face data may be sent from the server 130 to an electronic device 120 and then may be sent from the electronic device 120 to the smart container 110. The computer executable code executed at block 204 may be communication module 628.

At optional block 205, computer-executable instructions stored on a memory of a device, such as a smart container, may be executed to present to a user using smart container 110 sensor data, second data, user interface data and/or information corresponding to or indicative or sensor data, second data, and/or user interface data. For example, sensor data may indicate that a volume is 90% and a temperature is 84 degrees Celsius. Further, user interface data may instruct the smart container to display the text, "caffeine content is 85 mg" or to broadcast the same via a speaker. Smart container may display or broadcast only that volume is 90% and a temperature is 84 degrees Celsius, only that the "caffeine content is 85 mg," or both that volume is 90% and a temperature is 84 degrees Celsius and caffeine content is 85 mg. The computer executable code executed at block 205 may be display module 631.

FIG. 2B depicts an example process flow 210 for receiving sensor data from a smart container, sending sensor data to a server, and receiving user interface data from a server. At block 211, computer-executable instructions stored on a memory of a device, such as an electronic device, may be executed to receive sensor data and optionally second data from a different electronic device (e.g. wearable), information corresponding to or indicative of sensor data and/or second data, and/or other information such information about a user account associated with the smart container, product information and/or smart container model information. Upon receiving the sensor data, second data and/or other information, the electronic device 120 may optionally save the sensor data and/or other information on electronic device 120.

At block 212, computer-executable instructions stored on a memory of a device, such as an electronic device, may be executed to send sensor data and/or second data, information indicative of sensor data and/or second data, and/or other information such information about a user account associated with the smart container, product information and/or model information from electronic device 120 to server 130. As explained above, the sensor data and other information may be sent via a well-known wireless connection such as Bluetooth, BLE, WiFi, ZigBee, Near Field Communication, cellular or another suitable wireless connection protocol.

At optional block 213, computer-executable instructions stored on a memory of a device, such as an electronic device, may be executed to receive or otherwise access user interface data by electronic device 120. As explained above, user interface data may include data or information based on or corresponding to the sensor data such as data, analysis, images, tables, plots, insight, and any other information based on the sensor data. It is understood that user interface data may be based on sensor data previously sent from the smart container 110 to server 130. User interface data may also be based on performance data (e.g., goals, limits, etc.) associated with a user account and/or second data received from a second device different from smart container 110 such as a wearable.

At optional block 214, computer-executable instructions stored on a memory of a device, such as an electronic device, may be executed to present to a user using electronic device 120 sensor data, data corresponding to or indicative of sensor data, second data, and/or user interface data via electronic device 120 (e.g., display user interface data, broadcast user interface data via a speaker). As electronic device 120 may receive sensor data and user interface data, as well as information corresponding thereto, the electronic device may present one or more of sensor data, user interface data, and any information corresponding thereto. It is further understood that electronic device 120 may be associated with one or more smart containers and other smart devices and other devices with sensors (e.g., wearables) that also may send information (e.g. sensor data) to electronic device 120 and/or server 130 and that electronic device 120 may receive information from server 130 (e.g., user interface data) from the other devices and thus electronic device 120 may present sensor data, user interface data, and any information corresponding thereto, corresponding to smart container 110 and/or other devices.

At optional block 215, computer-executable instructions stored on a memory of a device, such as an electronic device, may be executed to send user interface data and/or information corresponding thereto, to smart container 130. In this manner, server 130 may send user interface data to electronic device 120 and electronic device 120 may send user interface data to smart container 110. As explained above, the same electronic device that received sensor data and information corresponding thereto from the smart container and sent that sensor data and information to server 130 may be the same electronic device that receives or otherwise accesses user interface data from server 130 and displays or otherwise presents sensor data, information corresponding thereto, and/or user interface data. Alternatively, the electronic device that receives sensor data and information corresponding thereto and sends the same to the server 130 may be different from the electronic device that receives the user interface data and displays or otherwise presents the user interface data and/or sends the user interface data to container device 110 at optional block 215. In one embodiment, electronic device 120 and smart container 110 may be associated with the same user account.

FIG. 2C depicts an example process flow 220 for receiving sensor data at a server 130, determining user interface data, and causing the user interface data to be displayed or otherwise presented at a display device such as the smart container 110. At block 221, computer-executable instructions stored on a memory of a device, such as a server, may be executed to receive sensor data, information corresponding to or indicative of sensor data, and/or other information such information about a user account associated with the smart container, smart container product information and/or smart container model information. This information may be received from an electronic device 120 or may come directly from smart container 110. The computer executable code executed at block 221 may be communication module 728.

At block 222, computer-executable instructions stored on a memory of a device, such as a server, may be executed to save the sensor data, information corresponding to or indicative of sensor data, and/or other information such as information about a user account associated with the smart container, product information and/or model information. For example, upon receiving the sensor data and other information electronic device 120 may optionally save the sensor data and/or other information on server 130 and/or on another device such as a datastore. The computer executable code executed at block 222 may be implementation module 730.

At block 223, computer-executable instructions stored on a memory of a device, such as a server, may be executed to apply performance data to the sensor data. The performance data may relate to limits, thresholds, goals, and/or other metrics saved to a user account associated with the smart container 110 from which the sensor data, information corresponding to or indicative of sensor data, and/or other information was sent from. This information may provide context and/or actionable insight to the information received from smart container 110. For example, performance data may include a limit of 90 mg of caffeine per day. This information may be applied or otherwise combined with the sensor data received from smart container 110 to generate actionable insight (e.g., maximum caffeine intake has been achieved). The computer executable code executed at block 223 may be data analysis module 726.

At block 224, computer-executable instructions stored on a memory of a device, such as a server, may be executed to apply second data to the sensor data. The second data may relate to sensor data and or other data or information that is determined and/or generated by a device different from smart container 110. The second device may send data to server 130 in the same manner as smart device 110 described herein. For example, second data may be determined or generated from a second smart container and may correspond to caffeine consumption using the second smart container. In another example, second data may be determined from a wearable watch and may correspond to a heartrate of the user. In yet another example, second data may be determined by a blood glucose monitor and second data may correspond to a blood glucose measurement. The computer executable code executed at block 224 may be data analysis module 726.

At block 225, computer-executable instructions stored on a memory of a device, such as a server, may be executed to process the sensor data, information corresponding to or indicative of sensor data, and/or other information to determine user interface data. Server 130 may determine user interface data by processing sensor data, data indicative or corresponding to sensor data, and/or information about a user account associated with the smart container, product information, model information as well as optionally performance data and or second data. User interface information may cause a display device such as a smart container and/or an electronic device to present (e.g., display or broadcast audibly) data, analysis, and/or insight via the smart container and/or electronic device. For example, user interface data involve graphics, tables, images and/or any other information based on sensor data, second data, and/or performance data. User interface data may include additional data, analysis, and/or insight. For example, server 130 may use a first volume measurement and a second volume measurement to determine user interface data corresponding to a volume consumed by a user using smart container 110. In another example, the server may compare sensor data (e.g., light intensity, wavelength absorption information, wavelength absorption plot, etc.) to a library or database of known sensor data and associated fluid content data to determine the content of fluid in smart container 110, as described in greater detail below with respect to FIGS. 3 and 4. The computer executable code executed at block 225 may be data analysis module 726 and/or user interface module 727.

At block 226, computer-executable instructions stored on a memory of a device, such as a server, may be executed to cause the user interface data to be displayed or otherwise presented on a display device. As explained above, electronic device 120 and/or smart container 110 may be a display device. For example, server 130 may send the display device the user interface data and/or instruct the display device to display or otherwise present (e.g., audibly) the user interface data. Alternatively, or in addition, server 130 may inform the display device that the user interface data is available to be viewed on the display device and the display device may access user interface data from the server (e.g., on the cloud). In another example, electronic device 120 may access user interface data from server 130 and container device 110 may access user interface data from electronic device 120. The computer executable code executed at block 226 may be user interface module 727 and/or communication module 728.

Figure 3:
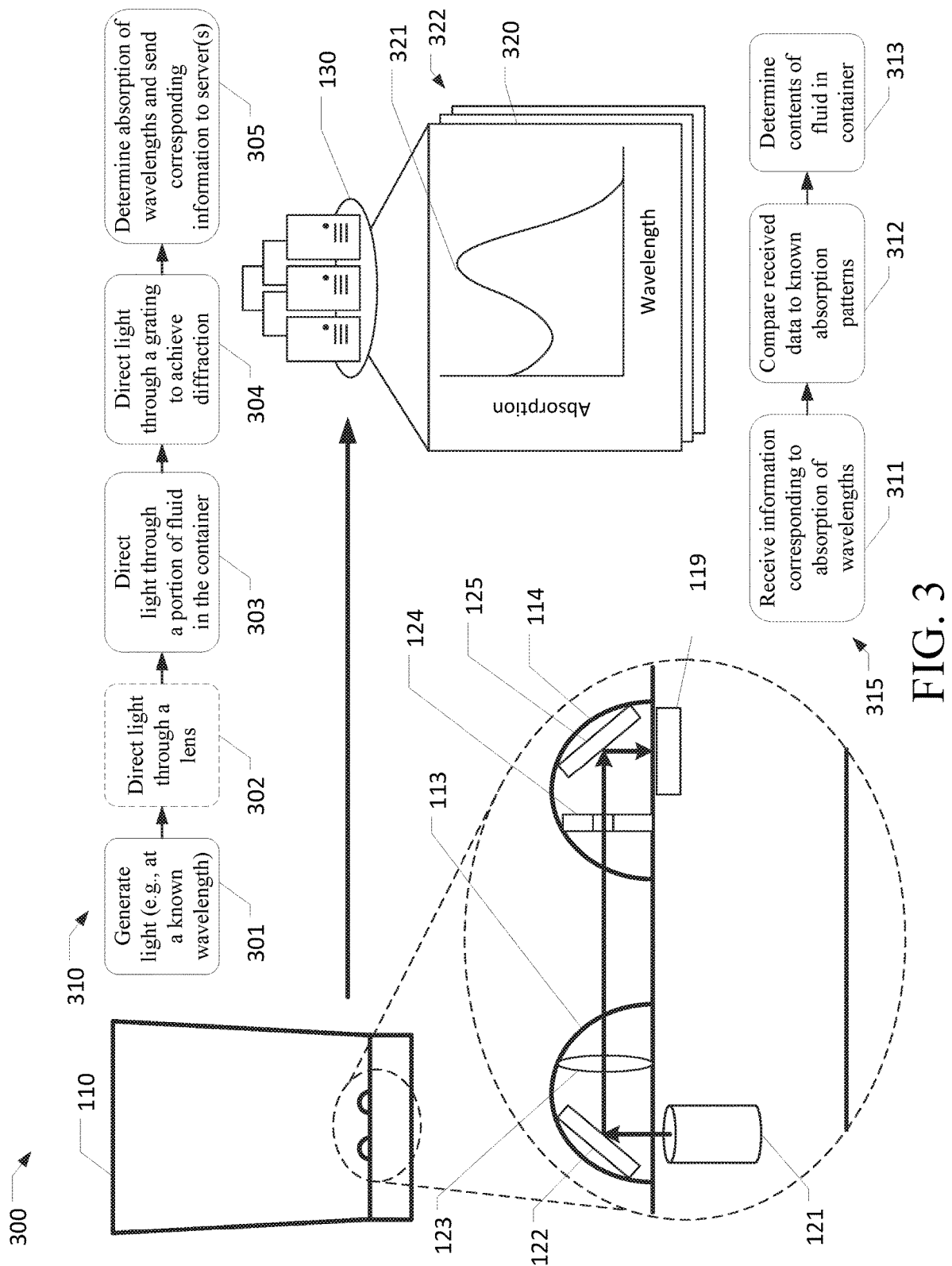
FIG. 3 is a schematic illustration of an example use case for determining fluid content data by passing light through a fluid and determining absorbed wavelengths in accordance with one or more example embodiments of the disclosure.

FIG. 3 is a schematic illustration of an example use case 300 for determining and/or generating sensor data using contents sensor 119 for determining sensor data such as wave absorption data. As explained above, smart container 110 may generate sensor data using contents sensor 119 and may send sensor data to sever 130 either directly or via electronic device 120. Sensor data generated by contents sensor 119 may be indicative of the contents of fluid in smart container 110. To generate sensor data, smart container 110 may include emitting lens 113 and receiving lens 114 which may be disposed on smart container 110 in fluid communication with fluid in smart container 110. For example, emitting lens 113 and receiving lens 114 may be positioned on a wall of electronics portion 112 in contact with the fluid. Alternatively, emitting lens 113 and receiving lens 114 may be disposed on a wall of container housing portion 111 in contact with the fluid within smart container 110.

The emitting lens 113 and receiving lens 114 may dome shaped and/or may be made from a scratch resistant material that is transparent, or at least transparent at a portion of emitting lens 113 and receiving lens 114. For example, the emitting lens 113 and receiving portion 114 may be made from a scratch resistant glass. It is understood that emitting lens 113 and/or receiving lens 114 may be any other shape (e.g., may have rectangular or oblong cross section). The emitting lens 113 may house a mirror 122 and/or a lens 123 that may be disposed within and/or partially disposed within emitting lens 113. Alternatively, lens 123 may be incorporated into emitting lens 113. Emitting lens 113 may be positioned over light source 121 or may otherwise be positioned with respect to light source 121 such that mirror 122 is in optical communication with light source 121 and angled to directed light from light source 121 to mirror 125. Lens 123 may be designed to direct light to receiving lens 114. In one embodiment lens may be a convergent lens. In another embodiment the lens may be a divergent lens. The light source 121 may be disposed within the electronic housing 112 or alternatively may be disposed within the emitting lens 113. The light source 121 may emit a light with a known wavelength. The light source may be designed to modify or otherwise change the type of light (wavelength) emitted from light source 121. In one example, light source may emit ultraviolet (UV) light. For example, light source 121 be a UV LED that may emit UV light in the range of 200-330 nm. Light source 121 may optionally have a peak wavelength of 270 nm in another example.

The receiving lens 114 may house a grating 124 and/or a mirror 125. The mirror 125 may be in optical communication with the mirror 122 of emitting lens 113 and/or light source 121. Grating may be a planar structure with a slit designed to permit the passage of light in a manner causing the diffraction of light to various wavelengths. Receiving lens 114 may be positioned over or on contents sensor 119. Alternatively, contents sensor 119 may be positioned within or partially within receiving lens 114. Mirror 125 may be angled to direct light from mirror 122 to contents sensor 119. The receiving lens 114 may optionally house a second lens that may be disposed within and/or partially disposed within emitting lens 113. Alternatively, the second lens may be incorporated into emitting lens 113. The second lens may be positioned between the grating 124 and the fluid or between the grating 124 and the mirror. In one example, the second lens may be similar to lens 123.

In the configuration illustrated in FIG. 3, light source may generate light that may be directed toward mirror 122, reflected from mirror 122 through the fluid and grating 124 and to mirror 125, and reflected from mirror 125 toward contents sensor 119. In this manner, light may pass from emitting lens 113, through fluid in smart container 110 and into receiving lens 114, ultimately being received and/or detected by contents sensor 119. As light may be absorbed, obstructed, or otherwise altered as it passes through the fluid, properties of the light received by contents sensor 119 may differ from the light generated at light source 121. In this manner, smart container 110 may include a photospectrometer. In one example, contents sensor 119 may be an IC photospectrometer or a photospectrometer on-a-chip. Different embodiments may include different, additional, or fewer entries than those illustrated in the example of FIG. 3.

To initiate the actions of determining sensor data using light source 121, emitting lens 113, receiving lens 114 and contents sensor 119, an example process flow 310 is presented and may be performed, for example, by one or more modules at smart container 110. The smart container 110 may include at least one memory that stores computer-executable instructions and at least one processor configured to access the at least one memory and execute the computer-executable instructions to perform various actions or operations, such as one or more of the operations in the process flow 310 of FIG. 3.

At block 301, smart container 110 may generate a light using light source 121. As explained above, light source 121 may be designed to generate any type of light at known wavelengths. For example, light source 121 my generate UV light (e.g., UV light with a peak wavelength of 270 nm). Light source 121 may be designed to generate only one type of light or may alternatively be designed to generate different types of wavelengths and intensities that may be modified.

At optional block 302, smart container 110 may direct the light generated by light source 121 through a lens. The lens may be lens 123 incorporated into emitting lens 113. Light may be directed through lens 123 using mirror 122 to direct light generated by light sensor 121 through a desired portion of lens 123 or centered at a desired spot on lens 123. As explained above, the lens may be incorporated inside of emitting lens 113 or may be part of emitting lens 113 such that it is a portion of the scratch resistant material.

At block 303, the light generated by light source 121 may be directed through fluid that exists between emitting lens 113 and receiving lens 114. In one example, emitting lens 113 and receiving lens 114 may be positioned around 10 mm apart, permitted fluid within smart container 110 to fill the space between emitting lens 113 and receiving lens 114. However, it is understood that emitting lens 113 and receiving lens 114 may be spaced apart different distances, provided that fluid may fill the space between emitting lens 113 and receiving lens 114.

At block 304, light may be directed through grating 124. As explained above, grating 124 may be a planar structure with a slit extending through the planar structure, permitting light to pass through the planar structure. The size and orientation of the slit may be designed to cause light diffraction as light passes through the slit. In one example, the grating causes passing light to diffract into wavelengths that the light is composed of.

At block 305, sensor data may be generated using contents sensor 119. The sensor data may be indicative of the absorption of wavelengths of light by the fluid between emitting lens 113 and receiving lens 114. As explained above, the light may be directed from the grating to the contents sensor via mirror 125. The contents sensor may determine an absorption measurement at various wavelengths of received light. As light is passed through the fluid between emitting lens 113 and receiving lens 114, the fluid may absorb, obstruct or deflect some amount of the light, altering the absorption measurement by the contents sensor at certain wavelengths. In one example, light source 121, emitting lens 113 including mirror 122 and/or lens 123, receiving lens 114 including grating 124 and/or mirror 125, and/or contents sensor 121 collectively be referred to as a sensor assembly (e.g., caffeine sensor assembly).

Using the absorption measurements at the various wavelengths, smart container 110 may optionally generate a wavelength absorption plot with wavelengths on one axis and a corresponding absorption value on the other axis, such as wavelength absorption plot 320. The absorption measurements, the wavelength absorption plot and/or information corresponding thereto may be sent to server 130. For example, smart container 110 may send this information to electronic device 120 which may send it to server 130. Alternatively, smart container 110 may send this information directly to server 130, as discussed above.

Server 130 may receive and process the absorption measurements, the wavelength absorption plot and/or information corresponding thereto. To initiate the actions of receiving and processing this information by the server 130, an example process flow 315 is presented and may be performed, for example, by one or more modules at server 130. The server 130 may include at least one memory that stores computer-executable instructions and at least one processor configured to access the at least one memory and execute the computer-executable instructions to perform various actions or operations, such as one or more of the operations in the process flow 315. Alternatively, the steps described at process flow 315 may be performed by smart container 110 and/or be electronic device 120.

At block 311, server 130 may receive sensor data from contents sensor 119 such as the absorption measurements, the wavelength absorption plot and/or information corresponding thereto. It is understood that server 130 may receive other sensor data such as sensor data from sensors 115 and 116, other information from smart container 110, and/or other information from devices different from smart container 110 such as from wearable devices and/or other smart container devices, as described above. As also explained above, smart container may send sensor data and other information to server via electronic device or directly to server 130. At block 311, the server may save the received data and/or information to server 130 and/or at a different device (e.g., one or more datastores).

At block 312, server 130 may compare received sensor data, absorption measurements, wavelength absorption plot(s) and/or information corresponding thereto to known one or more of known sensor data, absorption measurements, wavelength absorption plot(s) and/or information corresponding thereto. For example, server 130 may maintain or otherwise access a library of wavelengths and corresponding absorption measurements and/or a library of known absorption plots similar to absorption plot 320. The known wavelength absorption plots may each correspond to fluid contents data and/or information corresponding to information about the contents and/or presence of caffeine, sugar, salt, alcohol, or any other ingredient, element, solute, particle, contaminant, and/or pollutant present in the fluid. Wavelength absorption plots may include an absorption amplitude, such as amplitude 321 of absorption plot 320, which may correspond to an amount of one or more contents in the fluid. It is understood that the wavelength absorption plot may be generated or determined by smart container 110 and/or may be generated and/or determined by server 130.

At block 313, the server 130 may determine the contents of a fluid in smart container 110 by comparing the wavelength absorption plot generated using the sensor data determined by contents sensor 119 to a library of known wavelength absorption plots 322, each corresponding to a certain fluid contents data. The fluid contents data may include the type of contents (e.g., caffeine, sugar, salt, alcohol) and/or and amount of the contents in the fluid in smart container 110 (e.g., 11 oz/mg). The server 130 may determine a matching wavelength absorption plot or a wavelength absorption plot that is substantially the same as the one generated using the sensor data and determine the contents of the fluid based on the fluid content data associated with the matching plot.

Figure 4:
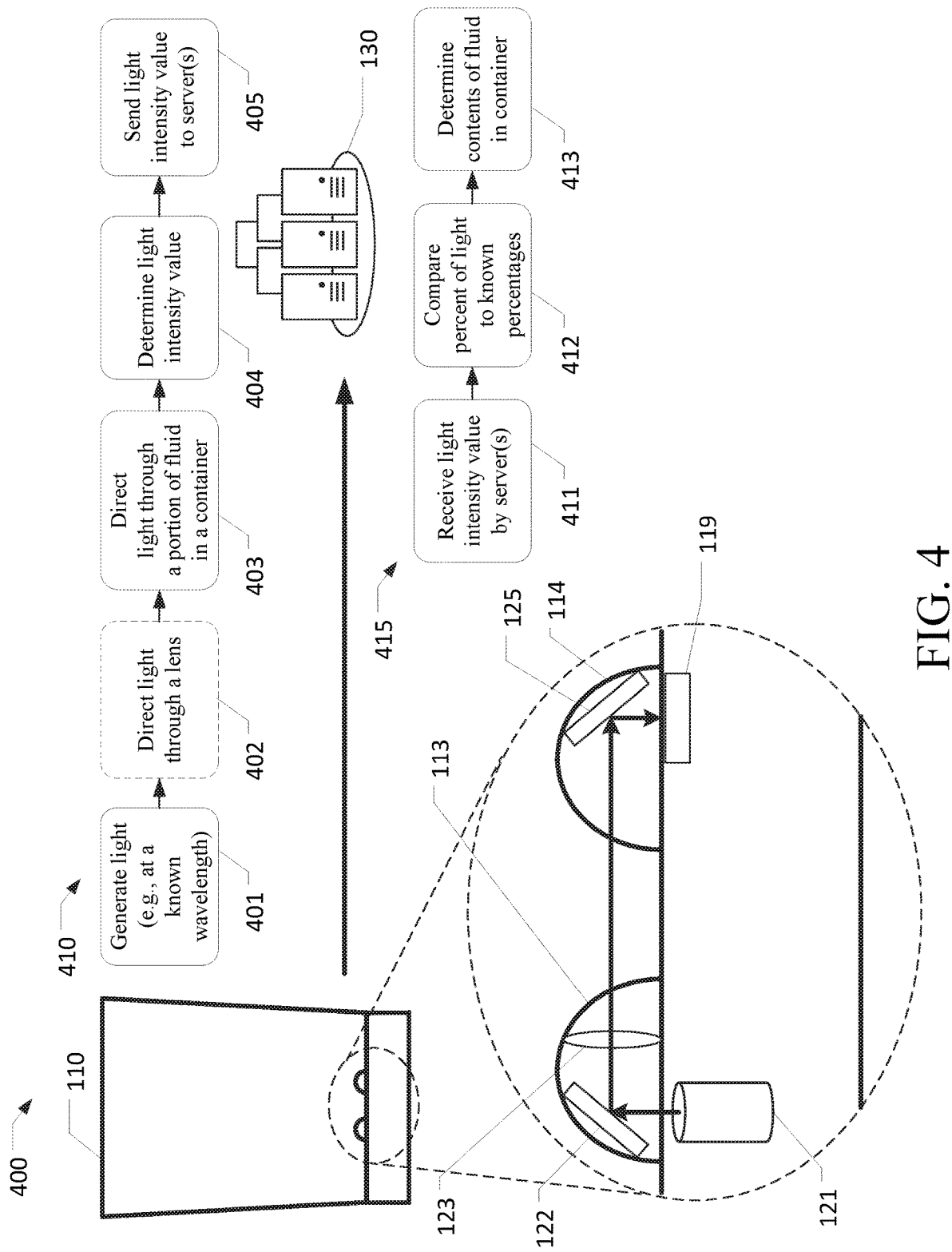
FIG. 4 is a schematic illustration of an example use case for determining fluid content data by passing light through a fluid and determining a light intensity value in accordance with one or more example embodiments of the disclosure.

FIG. 4 is a schematic illustration of an example use case 400 for determining and/or generating sensor data using contents sensor 119 for determining sensor data such as light intensity data. As explained above, smart container 110 may generate sensor data using contents sensor 119 and may send sensor data to sever 130 either directly or via electronic device 120. Different embodiments may include different, additional, or fewer entries than those illustrated in the example of FIG. 4.

Sensor data generated by contents sensor 119 may be indicative of the contents of fluid in smart container 110. To generate sensor data, smart container 110 may include emitting lens 113 and receiving lens 114 which may be disposed on smart container 110 in fluid communication with fluid within smart container 110. As explained above, emitting lens 113 and receiving lens 114 may be positioned on a wall of electronics portion 112 or may be disposed on a wall of container housing portion 111.

As explained above, emitting lens 113 and receiving portion 114 may dome shaped and/or may be made from a scratch resistant material that is transparent, at least at a portion of emitting lens 113 and receiving lens 114. The emitting lens 113 may house a mirror 122 and/or a lens 123 that may be disposed within and/or partially disposed within emitting lens 113. Alternatively, lens 123 may be incorporated into the scratch resistance material through which light passes. Emitting lens 113 may be positioned over light source 121 or may otherwise may be positioned with respect to light source 121 such that mirror 122 is in optical communication with light source 121 and angled to directed light from light source 121 to mirror 125. Lens 123 may be designed to direct light to receiving lens 114. Light source 121 may be disposed within electronic housing 112 and/or alternatively may be disposed within emitting lens 113. As explained above, light source 121 may emit a light with a known wavelength and/or may modify or otherwise change the type of light (wavelength) emitted from light source 121. In one example, light source may emit ultraviolet (UV) light.

The receiving lens 114 may house a mirror 125. The mirror 125 may be in optical communication with the mirror 122 of emitting lens 113 and/or light source 121. Receiving lens 114 may be positioned over or on contents sensor 119. Alternatively, contents sensor 119 may be positioned within or partially within receiving lens 114. Mirror 125 may be angled to directed light from mirror 122 to contents sensor 119. Contents sensor 119 may measure the intensity of received and/or detected light or any other property of light received and/or detected by contents sensor 119. For example, contents sensor 119 may be a wide band UV detector with UV LEDS. Contents sensor may output a signal (e.g., analog or digital over $i^2c$) based on an intensity of light received and/or detected by contents sensor 119. The receiving lens 114 may optionally house a second lens that may be disposed within and/or partially disposed within emitting lens 113. Alternatively, the second lens may be incorporated into emitting lens 113. The second lens may be positioned between the mirror 125 and the fluid, for example.

In the configuration illustrated in FIG. 4, light source may generate light that may be directed toward mirror 122, reflected from mirror 122 through the fluid and to mirror 125, and reflected from mirror 125 toward contents sensor 119. In this manner, light may pass from emitting lens 113, through fluid in smart container 110 and into receiving lens 114 ultimately being received by contents sensor 119. As light may be absorbed, obstructed, or otherwise altered as it passes through the fluid, properties of the light received by contents sensor 119 may differ from the light generated at light source 121. For example, light received and/or detected by contents sensor 119 have a light intensity value that is reduced or lower than the light intensity value of light at light source 121.

To initiate the actions of determining sensor data using light source 121, emitting lens 113, receiving lens 114 and contents sensor 119, an example process flow 410 is presented and may be performed, for example, by one or more modules at smart container 110. As explained above, the smart container 110 may include at least one memory that stores computer-executable instructions and at least one processor configured to access the at least one memory and execute the computer-executable instructions to perform various actions or operations, such as one or more of the operations in the process flow 410 of FIG. 3.

At block 401, smart container 110 may generate a light using light source 121. Block 401 may be the same or substantially the same as block 301. At optional block 402, smart container may direct the light generated by light source 121 through a lens. Optional block 402 may be the same or substantially the same as optional block 402. At block 403, the light generated by light source 121 may be directed through fluid that exists between emitting lens 113 and receiving lens 114. Block 403 may be the same or substantially the same as block 303.

At block 404, sensor data such as a light intensity value may be generated using contents sensor 119. As explained above, light may be directed from the light source to mirror 122, from mirror 122 to mirror 125 and from mirror 125 to contents sensor 119. Contents sensor 119 may receive and/or detect light and may determine a light intensity value. In one example, light source 121, emitting lens 113 include mirror 122 and/or lens 123, receiving lens 114 including mirror 125, and/or contents sensor 121 collectively be referred to as a sensor assembly (e.g., caffeine sensor assembly). A light intensity value of the light generated at light source 121 (e.g., original light intensity value) may also be known or measured and may be compared to the light intensity value measured by contents sensor 119 (reduced light intensity value). The reduced light intensity value may be compared to the original light intensity to determine a percentage of light received and/or percentage of light reduced. The reduced light intensity value may be compared to the original light intensity to determine a decrease in the intensity of light or any other metric corresponding to the reduced light intensity. Alternatively, the original light intensity value may be known by a different device or sent to a different device (e.g., server 130) and that device may compare the original light intensity value to the reduced light intensity value to determine a reduced light intensity percentage or metric.

At block 405, sensor data such as the light intensity value, reduced light intensity value, percentage of reduce light intensity value, and/or any other information corresponding to or indicative of the foregoing may be sent from the smart container 110 to the server 130. For example, smart container 110 may send this information to electronic device 120 which may send it to server 130. Alternatively, smart container 110 may send this information directly to server 130, as discussed above.

Server 130 may receive and process light intensity values, reduced light intensity values, percentage of reduced light intensity values, and/or any other information corresponding to or indicative of the foregoing. To initiate the actions of receiving and processing this information by the server 130, an example process flow 415 is presented and may be performed, for example, by one or more modules at server 130. The server 130 may include at least one memory that stores computer-executable instructions and at least one processor configured to access the at least one memory and execute the computer-executable instructions to perform various actions or operations, such as one or more of the operations in the process flow 415. Alternatively, the steps described at process flow 415 may be performed by smart container 110 and/or by electronic device 120.

At block 411, server 130 may receive light intensity values, reduced light intensity values, percentage of reduced light intensity values, and/or any other information corresponding to or indicative of the foregoing. As explained above, server 130 may receive a light intensity value determined by contents sensor 119 and an original light intensity value and compare the two values to determine a reduced light intensity and/or percentage of reduced light intensity or other information or metrics corresponding to or based on the light intensity values. For example, server 130 may receive the original light intensity value and reduced light intensity value determined by contents sensor 119 and may divide the reduced light intensity value by the original light intensity value to determine a percent of light value. Alternatively, this information may be sent to server 130. For example, this comparison may be done by contents sensor 119 and may be sent to server 130 by smart container 110.

At block 412, server 130 may compare the percent of reduced light intensity value, measured light intensity values, reduced light intensity values and/or any other information corresponding to the foregoing or indicative of the foregoing to known percentage of reduced light intensity values, measured light intensity values, reduced light intensity values and/or any other information corresponding to known fluid content data. For example, server 130 may maintain or otherwise access a library percent of reduced light values each associated with certain fluid contents data and/or information corresponding to information about the contents and/or presence of caffeine, sugar, salt, alcohol, or any other ingredient, element, solute, particle, contaminant, and/or pollutant present in the fluid.

At block 413, the server 130 may determine the contents of a fluid in smart container 110 by matching the percent of reduced light intensity value, measured light intensity values, reduced light intensity values and/or any other information corresponding to the foregoing to known percent of reduced light intensity value, measured light intensity values, reduced light intensity values and/or any other information corresponding to the foregoing corresponding to determine associated fluid contents data. For example, upon determining a percent of reduced light intensity value based sensor data from smart container 119, the server 130 may find the same or substantially similar value in the library of percent of reduced light values and determine the corresponding fluid contents data. In one example, the percent of reduced light intensity value may be a certain percentage that corresponds to the presence of caffeine. In another example, the reduced light intensity value or other value determined or received by server 130 may correspond to an amount of contents (e.g., caffeine) of the fluid within smart container 110.

Figure 5:
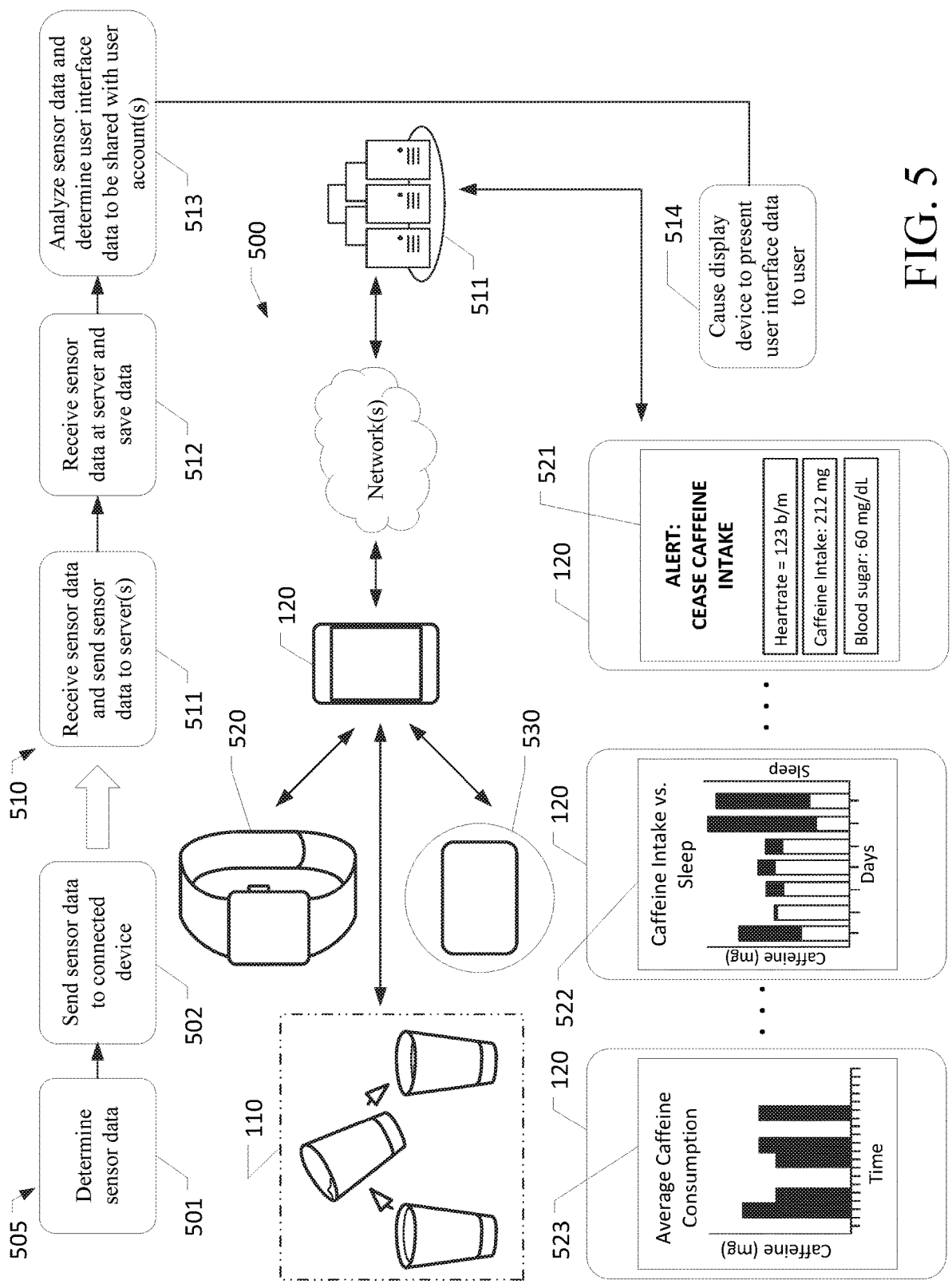
FIG. 5 is a schematic illustration of an example use case for determining sensor data by smart devices and sending the sensor data to one or more servers to be displayed on one or more display devices in accordance with one or more example embodiments of the disclosure.

FIG. 5 is a schematic illustration of an example use case 500 for determining sensor data from multiple devices, sending sensor data to server via an electronic device, analyzing the sensor data to determine display and causing the user interface data to be presented to a user of a display device. The smart container 110 may include at least one memory that stores computer-executable instructions and at least one processor configured to access the at least one memory and execute the computer-executable instructions to perform various actions or operations, such as one or more of the operations in the process 505. Also, the server 130 may include at least one memory that stores computer-executable instructions and at least one processor configured to access the at least one memory and execute the computer-executable instructions to perform various actions or operations, such as one or more of the operations in the process 510. Different embodiments may include different, additional, or fewer entries than those illustrated in the example of FIG. 5. For example, while three sensing devices (smart container 110, wearable device 520, and smart sensor 530) are shown in FIG. 5, it is understood that any number of sensing devices (e.g., smart devices, electronic devices, wearable devices, smart sensors, etc.) may be used.

To initiate the actions of determining sensor data and sending sensor data, an example process flow 505 is presented and may be performed, for example, by one or more modules at smart container 110. At block 501, smart container, wearable device 520 and smart sensor 530 may each determine sensor data. For example, smart container 110 may determine sensor data related to fluid in smart container 110 using sensor 115, sensor 116, and/or contents sensor 119 as described above with respect to FIGS. 1-4. In one example, smart container 110 may generate motion data as smart container 110 is moved in a sip-like motion, volume data before and after a sip has been taken by the user, and fluid contents data. Wearable device 520 may similarly include one or more sensors (e.g., heartrate sensor, accelerometer, temperature sensor, etc.) and may determine sensor data related to the user of smart container 110. For example, wearable device 520 may determine heartrate data and/or may determine information related to sleep patterns of the user using an accelerometer and the heartrate sensor. Smart sensor 530 may be a blood glucose monitor sensor and may determine blood sugar levels of the user of smart container 110. In one example, smart container 110, wearable device 520, and smart sensor 530 may be associated to the same user account.

At block 502, smart container 110, wearable device 520, and smart sensor 530 may send sensor data either to server 130 via electronic device 120 or directly to server 130. Smart container 110, wearable device 520, and smart sensor 530 may communicate with electronic device 120, server 130 and/or each other via well-known wireless connections such as WiFi, ZigBee, Bluetooth, BLE, Near Field Communication, cellular or another suitable wireless connection protocol. It is understood that smart container 110, wearable device 520, and smart sensor 530 may communicate with the same electronic device 120 or may communicate with different electronic devices.

To initiate the actions of receiving sensor data, analyzing sensor data and causing display devices to present user interface data, an example process flow 510 is presented and may be performed, for example, by one or more modules at server 130. At block 511, electronic device 120 may send sensor data and/or other information received by smart container 110, wearable device 520, and smart sensor 530 to server 130. It is understood that this information may be received at different times by electronic device 120 and/or may be periodically received by electronic device 120.

At block 512, server 130 may receive sensor data from one or more devices such as smart container 110, wearable device 520, and smart sensor 530, for example. It is understood that server may receive information corresponding, indicative of, and/or based on sensor data as well. It is further understood that server may receive other information such as performance data. Performance data may include goals or limits (e.g., for fluid consumption), exercise goals or limits, or any information related to wellbeing, exercise, food or fluid consumption, sleep, etc. A user may create a user profile saved on server 130 or accessible to server 130 that may include information about that user such as user information (e.g., age, weight, sex, etc.) and performance data. Server 130 may save sensor data associated with a user account or user profile or arrange for this information to be saved elsewhere.

At block 513, server 130 may analyze and/or process the sensor data and other information received from smart container 110, wearable device 520, and smart sensor 530 and/or saved to server 130 or accessible by server 130. For example, using motion data, volume data, and fluid contents data, server 130 may determine when a user of user device 110 consumed fluid from smart container 110, how much fluid was consumed at this time, and what the contents of the fluid were. Also, server 130 may record a heartrate data from wearable device 520 around the time the sensor data was generated by the smart container 110 and may also determine a blood sugar level measurement around this same time. Server 130 may compare the information received from smart container 110, wearable device 520, and smart sensor 530 to performance data to determine how the data impacts or otherwise affects certain limits and/or goals, for example. Further, server 130 may track previously received data to compute aggregated data or compare newly received data to saved data. In one example, server 130 may train machine learning algorithms or models and/or otherwise employ machine learning to determine trends and correlations in the data and information received from the devices (e.g., smart container 110, wearable device 520, smart sensor 530). For example, machine learning models may be trained to identify patterns corresponding to a sleep cycle that may be non-obvious. In another example, a machine learning model may be trained to determine certain habits or preferences associated with a user account.

Based on the analyzed and/or processed sensor data and other data, user interface data may be determined or generated. As explained above user interface data may involve graphics, tables, images and/or any other information based on sensor data, performance data, saved data, and/or any other information saved, accessible and/or received by server 130. For example, user interface data may cause a display device (e.g., electronic device) to display or otherwise present data or information based on or corresponding to the sensor data such as data, analysis, images, tables, plots, insight, and any other information.

At block 514, server 130 may cause the display devices (e.g., smart container, wearable device, electronic device, smart sensor, etc.) to present user interface data to a user. For example, server 130 may send user interface data to a display device. Alternatively, a display device may access the user interface data via server 130. For example, server 130 may inform display devices that user interface data is available to be viewed or otherwise presented. Server 130 may communicate with display devices via well-known wireless connections such as WiFi, ZigBee, Bluetooth, BLE, Near Field Communication, cellular or another suitable wireless connection protocol. Additionally, or alternatively, server 130 may send user interface data to electronic device 120 and electronic device 120 may send user interface data to display devices.

Referring now to user interfaces 521-523, exemplary user interfaces displaying user interface data are shown. In one example, user interface 521 is exemplary of an alert that may be generated using user interface data. The sensor data received by server 130 may have been used to determine that the caffeine intake for the day was 212 mg. Server 130 may have compared this value against performance data or known healthy limits and determined that this value exceeds a threshold for daily consumption. Server 130 may have also received information about a high heartrate (e.g., 123 b/min) and/or a concerning blood sugar level (e.g., 60 mg/dL). This information may be presented to a user using electronic device 120, for example, via a display or alternatively, or additionally, could be audibly presented to the user via a speaker.

User interface 522 is exemplary of a user interface that uses sensor data from multiple devices that has been aggregated and/or tracked. User interface 522 may include information about the amount of sleep of a user and the amount of caffeine a user consumes in a day. Server may have received this information from smart container 110 and wearable device 520, for example. This information may be presented to the user to show the correlation between the user's sleep pattern and the user's caffeine intake. In one example, user interface 522 may recommend that user drink less caffeine and may even suggest a caffeine limit (e.g., 90 mg/day). This information may be presented to a user using electronic device 120, for example, via a display or alternatively, or additionally, could be audibly presented to the user via a speaker.

User interface 523 is exemplary of using sensor data and known information such as time to generate graphical representations of the user's consumption of a fluid (e.g., caffeine). User interface 523 may be presented to a user to inform a user about their caffeine intake throughout the day. In one example, user interface 523 may even suggest that the user limit their caffeine intake at certain times throughout the day to spread out the caffeine intake. User interface 523 could also compare this graphic to a heartrate and/or blood sugar level, for example, to show the correlation between caffeine intake and the user's health or wellbeing throughout the day.

Illustrative Device Architecture

Figure 6:
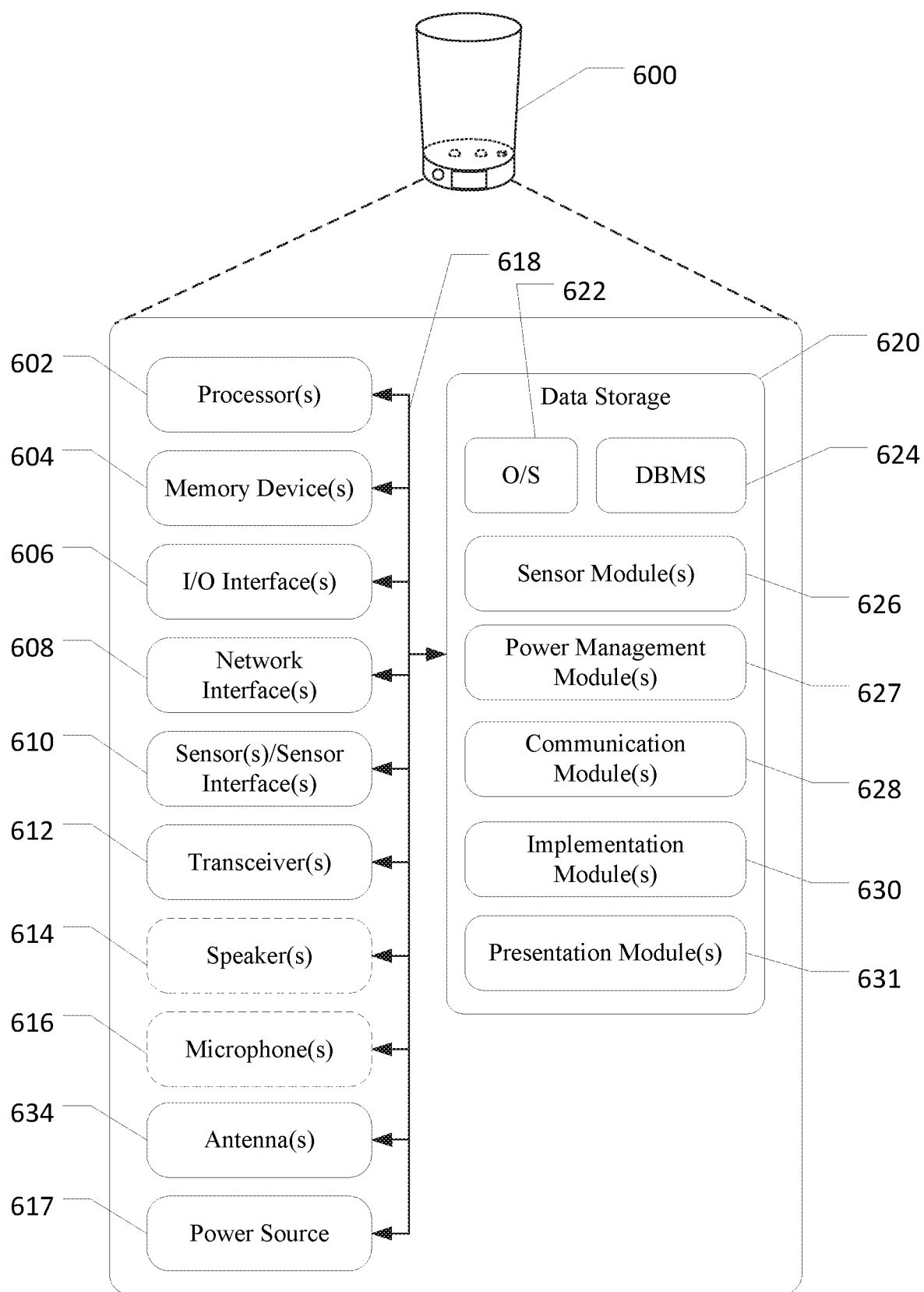
FIG. 6 is a schematic block diagram of an illustrative smart container in accordance with one or more example embodiments of the disclosure.

FIG. 6 is a schematic block diagram of an illustrative the smart container 600 in accordance with one or more example embodiments of the disclosure. The smart container 600 may include any suitable computing device capable of receiving and/or sending data, and may optionally be coupled to devices including, but not limited to, an electronic device such as a smartphone, tablet, e-reader, mobile device, wearable device, or the like and; one or more servers; or the like. The smart container 600 may correspond to an illustrative device configuration for smart container 110 and any other smart devices of FIGS. 1-5.

The smart container 600 may be configured to communicate via one or more networks with one or more servers, electronic devices, user devices, wearable devices, smart sensors, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the smart container 600 may include one or more processors (processor(s)) 602, one or more memory devices 604 (generically referred to herein as memory 604), one or more input/output (I/O) interface(s) 606, one or more network interface(s) 608, one or more optional sensors or sensor interface(s) 610, one or more transceivers 612, one or more optional speakers 614, one or more optional microphones 616, one or more antenna(s) 634, and power source 617 which may be a power source such as a battery (e.g., rechargeable battery). The smart container 600 may further include one or more buses 618 that functionally couple various components of the smart container 600. The smart container 600 may further include one or more antenna(e) 634 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the smart container 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the smart container 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more optional database management systems (DBMS) 624; and one or more program module(s), applications, engines, computer-executable code, scripts, or the like such as, for example, one or more sensor module(s) 626, one or more power management module(s) 627, one or more communication module(s) 628, one or more implementation module(s) 630, and/or one or more presentation module(s) 631. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the smart container 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the smart container 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the sensor module(s) 626 may include computer-executable instructions, code, or the like that responsive to execution by one or more of the processor(s) 602 may perform functions including, but not limited to, sensing, determining, measuring, obtaining, generating, or otherwise acquiring sensor data and/or information based on or indicative of sensor data. Where sensor data is analog data, sensor module may oversee the conversion to digital sensor data.

Power management module 627 may include computer-executable instructions, code, or the like that responsive to execution by one or more of the processor(s) 602 may perform functions including, but not limited to, overseeing, modifying and otherwise managing the power and energy usage of smart container 110. For example, power management module 627 may control the operation of power source 617 to save energy and otherwise operate efficiently. In one example, power management module 627 may reduce or eliminate power consumption by non-essential components (e.g., one or more sensors) until power is needed by that component.

The communication module(s) 628 may include computer-executable instructions, code, or the like that are responsive to execution by one or more of the processor(s) 602 may perform functions including, but not limited to, communicating with one or more devices, for example, via wired or wireless communication, communicating with electronic devices, communicating with one or more servers (e.g., remote servers), communicating with remote datastores and/or databases, sending or receiving notifications or commands/directives, communicating with cache memory data, communicating with user devices (wearable devices and/or smart sensors), and the like.

The implementation module(s) 630 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, determining electronic devices and user devices associated with a user account, sending signals to user devices, electronic devices, other computing devices, servers, datastores and the like, initiating commands locally or at remote devices, and the like.

The display module(s) 631 may include computer-executable instructions, code, or the like that are responsive to execution by one or more of the processor(s) 602 may perform functions including, but not limited to, displaying and/or otherwise presenting sensor data, user interface data, user information, and any other information determined, generated, accessed, received, and/or otherwise obtained by smart container 110. Information may be displayed using a digital display and/or presented audibly using a speaker. Display module(s) may further cause smart container 110 to generate alerts via vibration, beeps, alarms and/or any other method of presenting information.

Referring now to other illustrative components depicted as being stored in the data storage 620, the O/S 622 may be loaded from the data storage 620 into the memory 604 and may provide an interface between other application software executing on the smart container 600 and hardware resources of the smart container 600. More specifically, the O/S 622 may include a set of computer-executable instructions for managing hardware resources of the smart container 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the smart container 600 is a mobile electronic device, the DBMS 624 may be any suitable light-weight DBMS optimized for performance on a mobile device.

Referring now to other illustrative components of the smart container 600, the optional input/output (I/O) interface(s) 606 may facilitate the receipt of input information by the smart container 600 from one or more I/O devices as well as the output of information from the smart container 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the smart container 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The smart container 600 may further include one or more network interface(s) 608 via which the smart container 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the smart container 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the smart container 600. The transceiver(s) 612 may further include a low noise amplifier (LNA), additional signal amplifiers, an analog-to-digital (A/D) converter, one or more buffers, a digital baseband, or the like.

The optional sensor(s)/sensor interface(s) 610 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 610 may additionally, or alternatively, include health related sensors such as electrocardiogram (ECG) sensors, glucose sensors, heartrate sensors, temperature sensors, and the like. The optional speaker(s) 614 may be any device configured to generate audible sound. The optional microphone(s) 616 may be any device configured to receive analog sound input or voice data, and may include noise cancellation functionality.

Figure 7:
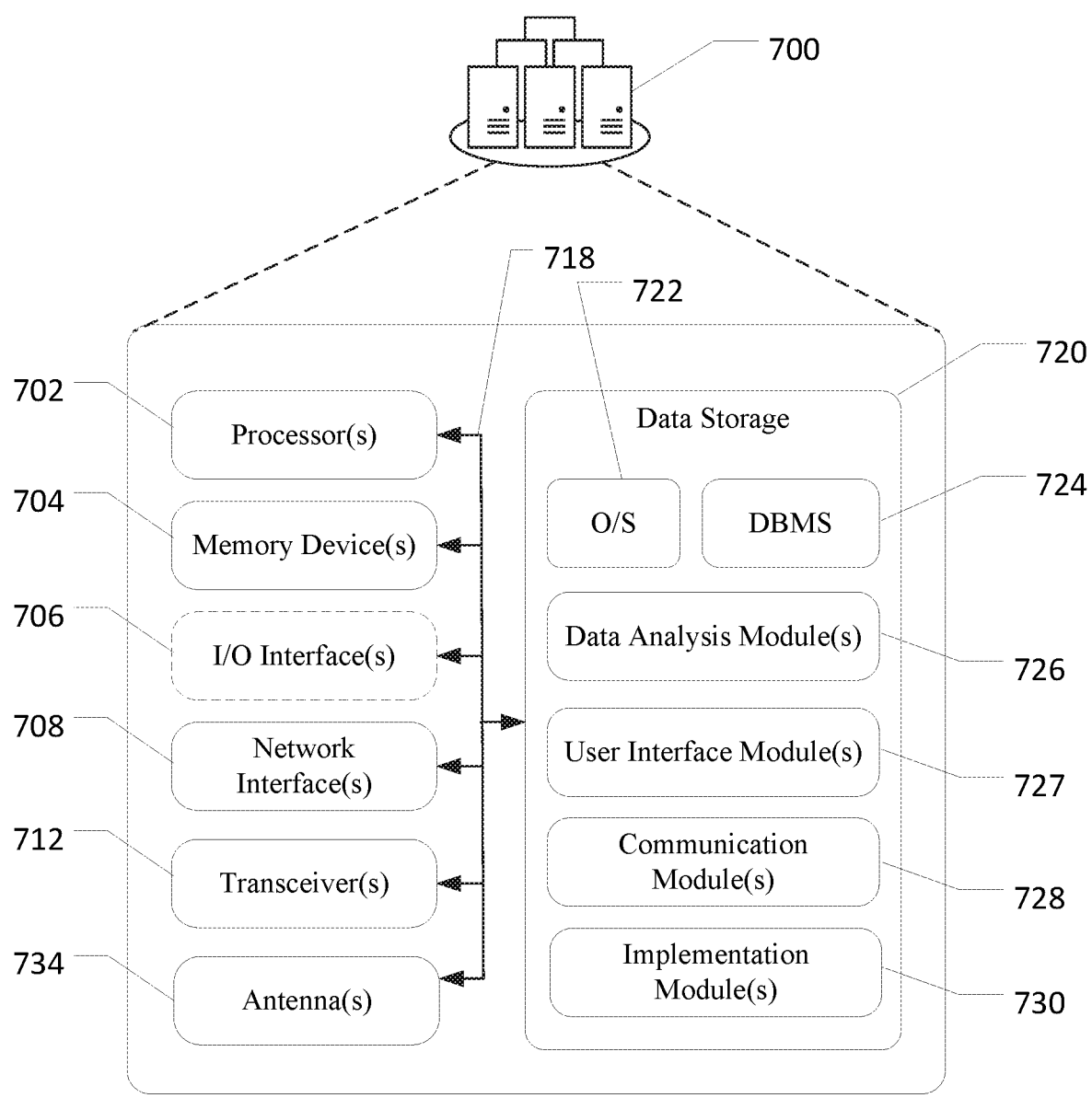
FIG. 7 is a schematic block diagram of one or more servers in accordance with one or more example embodiments of the disclosure.

FIG. 7 is a schematic block diagram of an illustrative sever 700 in accordance with one or more example embodiments of the disclosure. The server 700 may be one or more servers and may include any suitable computing device capable of receiving and/or sending data, and may optionally be coupled to devices including, but not limited to, electronic devices such as a smartphone, tablet, e-reader; one or more smart containers; one or more user devices (e.g., wearable devices and/or smart sensors); a desktop computer; a laptop computer; one or more servers; datastores; or the like. The server 700 may correspond to an illustrative device configuration for sever 130 and any other servers of FIGS. 1-5.

The server 700 may be configured to communicate via one or more networks with one or more servers, smart containers, user devices, electronic devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the sever 700 may include one or more processors (processor(s)) 702, one or more memory devices 704 (generically referred to herein as memory 704), one or more optional input/output (I/O) interface(s) 706, one or more network interface(s) 708, one or more transceivers 712, one or more antenna(s) 734, and data storage 720. The server 700 may further include one or more buses 718 that functionally couple various components of the server 700. These various components will be described in more detail hereinafter.

The sever 700 may further include one or more antenna(e) 734 that may have the same or substantially the same features, operation, and/or functionality as described above with respect to antenna(e) 634. The bus(es) 718 may have the same or substantially the same features, operation, and/or functionality as described above with respect to bus(es) 618. The memory 704 may have the same or substantially the same features, operation, and/or functionality as described above with respect to memory 604.

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more optional database management systems (DBMS) 724; and one or more program module(s), applications, engines, computer-executable code, scripts, or the like such as, for example, one or more data analysis module(s) 726, one or more user interface module(s) 727, one or more communication module(s) 728, and/or one or more implementation module(s) 730. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the server device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user contact data, device pairing information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the data analysis module(s) 726 may include computer-executable instructions, code, or the like that responsive to execution by one or more of the processor(s) 702 may perform functions including, but not limited to, analyzing sensor data, second data, performance data, user profile data, saved data, information corresponding to any of the foregoing, and/or any other data or information to generate additional information and/or data, analysis and insight.

The user interface module(s) 727 may include computer-executable instructions, code, or the like that are responsive to execution by one or more of the processor(s) 702 may perform functions including, but not limited to, determining user interface data to be displayed by one or more display devices. User interface module may determine and/or generate data, analysis, images, tables, plots, insight, and any other information to be presented on display devices.

The communication module(s) 728 may include computer-executable instructions, code, or the like that are responsive to execution by one or more of the processor(s) 702 may perform functions including, but not limited to, communicating with one or more devices, for example, via wired or wireless communication, communicating with electronic devices, user devices, smart containers, communicating with servers (e.g., remote servers), communicating with remote datastores and/or databases, sending or receiving notifications or commands/directives, communicating with cache memory data, communicating with user devices, and the like.

The implementation module(s) 736 may include computer-executable instructions, code, or the like that are responsive to execution by one or more of the processor(s) 702 may perform functions including, but not limited to, overseeing coordination and interaction between modules and computer executable instructions in data storage 720, performing actions and tasks associated with determining user interface data, determining actions associated with user interactions or input, aggregating and organizing data and information, determining smart container and/or user devices associated with a user account, sending signals, alerts, messages, data and/or information to user devices, electronic devices, smart containers, other computing devices, servers, datastores and the like, initiating commands locally or at smart container and/or electronic devices, and the like.

Referring now to other illustrative components depicted as being stored in the data storage 720, the O/S 722 may be loaded from the data storage 720 into the memory 704 and may provide an interface between other application software executing on the server 700 and hardware resources of the server 700. More specifically, the O/S 722 may include a set of computer-executable instructions for managing hardware resources of the server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The optional DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 700, the optional input/output (I/O) interface(s) 706 may have the same or substantially the same features, operation, and/or functionality as described above with respect to input/output (I/O) interface(s) 606. The server 700 may further include one or more network interface(s) 708 via which the server 700 may communicate with any of a variety of other systems, platforms, networks, devices, and so forth. The network interface(s) 708 may enable communication, for example, with one or more electronic devices, connected devices, mobile devices, one or more wireless routers, one or more host servers, one or more web servers, and the like via one or more of networks. The transceiver(s) 712 may have the same or substantially the same features, operation, and/or functionality as described above with respect to transceiver(s) 612.

It should be appreciated that the program module(s), applications, computer-executable instructions, code, or the like depicted in FIG. 6 as being stored in the data storage 620, or depicted in FIG. 7 as being stored in the data storage 720, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the smart container 600, server 700 and/or hosted on other computing device(s) accessible via one or more networks, may be provided to support functionality provided by the program module(s), applications, or computer-executable code depicted in FIG. 6, FIG. 7 and/or additional or alternate functionality. Further, functionality may be modularized differently such that processing is described as being supported collectively by the collection of program module(s) depicted in FIG. 6 and/or or FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 and/or FIG. 7 may be implemented, at least partially, in hardware and/or firmware across any number of devices.

It should further be appreciated that the smart container 600 and/or server 700 may include alternate and/or additional hardware, software, or firmware components beyond those described or depicted without departing from the scope of the disclosure. More particularly, it should be appreciated that software, firmware, or hardware components depicted as forming part of the smart container 600 and/or server 700 are merely illustrative and that some components may not be present or additional components may be provided in various embodiments. While various illustrative program module(s) have been depicted and described as software module(s) stored in data storage 620 and/or data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A drinkware comprising:
a housing defining a reservoir configured to retain a fluid;
a display configured to present information;
a pressure sensor coupled to the housing and in fluid communication with the fluid, the pressure sensor configured to determine a first volume measurement corresponding to a first volume of the fluid in the reservoir at a first time and a second volume measurement corresponding to a second volume of the fluid in the reservoir at a second time;
a caffeine sensor assembly for determining a caffeine measurement associated with the fluid in the reservoir, the caffeine assembly comprising:
an ultraviolet (UV) light source configured to generate UV light,
an emitting lens interfacing with the reservoir, the emitting lens configured to direct the UV light into the fluid,
a UV sensor configured to generate a signal indicative of the caffeine measurement,
a receiving lens interfacing with the reservoir and in optical communication with the fluid, the receiving lens configured to receive a portion of the UV light from the fluid and direct the portion of the UV light to the UV sensor; and
a processor configured to:
determine a caffeine consumption value based on the first volume measurement, the second volume measurement and the caffeine measurement; and
send to the display the caffeine consumption value for presentation.

2. The drinkware of claim 1, wherein the caffeine measurement is indicative of a light intensity of the portion of the UV light directed to the UV sensor and the processor is further configured to determine a reduced light intensity percentage by comparing the caffeine measurement to an original light intensity value to determine a reduced light intensity percentage.

3. The drinkware of claim 2, wherein the processor is further configured to determine a caffeine concentration by comparing the reduced light intensity percentage to a library of reduced light intensity percentages associated with caffeine concentrations.

4. The drinkware of claim 1, wherein the processor is further configured to cause the caffeine consumption value to be sent to a device.

5. A drinkware comprising:
a housing defining a reservoir configured to retain a fluid;
a sensor assembly comprising a light source configured to emit light into the reservoir and a first sensor configured to receive a portion of the light from the reservoir after passing through the fluid, wherein an output of the first sensor is a light intensity value indicative of a content level in the fluid;
a second sensor configured to determine a first volume measurement corresponding to a first volume of the fluid in the reservoir at a first time and a second volume measurement corresponding to a second volume of the fluid in the reservoir at a second time; and
a controller for storing the output of the first sensor, the first volume measurement, and the second volume measurement, wherein the controller is configured to:
determine a light intensity percentage based on the light intensity value;
determine a content concentration value based on the light intensity percentage; and
determine a consumed content value based on the first volume measurement, the second volume measurement, and the content concentration value.

6. The drinkware of claim 5, wherein the content concentration value is indicative of a caffeine concentration value in the fluid.

7. The drinkware of claim 5, wherein the sensor assembly further comprises a lens configured to pass the light into the fluid, and the controller is configured to compare the light intensity value to a second light intensity value of the light to determine the light intensity percentage.

8. The drinkware of claim 7, further comprising a display and wherein controller is configured to:

determine the content concentration value corresponding to the light intensity percentage using a library of light intensity percentages and associated content concentration values; and;

and cause the display to present the consumed content value.

9. The drinkware of claim 5, wherein the sensor assembly further comprises a lens configured to pass the light into the fluid and a grating configured to diffract a portion of the light.

10. The drinkware of claim 9, wherein the output of the first sensor is indicative of wavelength absorption data, and the controller is further configured to determine a wavelength absorption plot based on the wavelength absorption data.

11. The drinkware of claim 10, further comprising a display and wherein the controller is further configured to:

determine the content concentration value using a library of wavelength absorption plots and associated content concentration values; and cause the display to present the consumed content value.

12. The drinkware of claim 5, wherein the controller is further configured to send one or more of the output of the first sensor, the first volume measurement, and the second volume measurement to a device.

13. The drinkware of claim 12, further comprising a third sensor configured to determine a motion measurement indicative of motion of the drinkware, wherein the controller is further configured to send the motion measurement to the device.

14. A drinkware comprising:

a housing defining a reservoir configured to retain a fluid;

a first sensor comprising a light source configured to emit light into the reservoir;

a second sensor;

memory configured to store computer-executable instructions; and at least one computer processor configured to access memory and execute the computer-executable instructions to:

determine first sensor data using the first sensor, wherein the first sensor data is a light intensity value indicative of a content measurement;

determine second sensor data using the second sensor, the second sensor data indicative of a first volume of fluid in the device;

determine third sensor data using the second sensor, the third sensor data indicative of a second volume of fluid in the device;

determine a light intensity percentage based on the light intensity value;

determine a content concentration value based on the light intensity percentage; and determine a consumed content value based on the light intensity value, the second sensor data, and the third sensor data.

15. The drinkware of claim 14, wherein the at least one computer processor is further configured to access memory and execute the computer-executable instructions to send one or more of the first sensor data, second sensor data, or third sensor data to a device that is in wireless communication with the drinkware.

16. The drinkware of claim 14, wherein the content measurement is a measurement of caffeine and the at least one computer processor is further configured to access memory and execute the computer-executable instructions to determine a consumed caffeine amount based on the first sensor data, the second sensor data and third sensor data.

17. The drinkware of claim 14, further comprising an ultraviolet (UV) light source, wherein the at least one computer processor is further configured to access memory and execute the computer-executable instructions to emit UV light from the UV light source, through the fluid, and to the first sensor, and wherein the first sensor data is based on a portion of UV light received by the first sensor.

18. The drinkware of claim 14, wherein the at least one computer processor is further configured to:

determine the light intensity percentage based on the light intensity value and an original light intensity value, and determine the content concentration value based on the reduced light intensity value.

19. The drinkware of claim 14, wherein the first sensor data is indicative of wavelength absorption data, and the at least one computer processor is further configured to:

determine a wavelength absorption plot based on the first sensor data indicative of the wavelength absorption data; and determine the content concentration value based on the wavelength absorption plot.

20. The device of claim 14, further comprising a display, wherein the at least one computer processor is further configured to access memory and execute the computer-executable instructions to display information based on one or more of the first sensor data, second sensor data, or third sensor data.

* * * * *